United States Patent Office 3,756,933
Patented Sept. 4, 1973

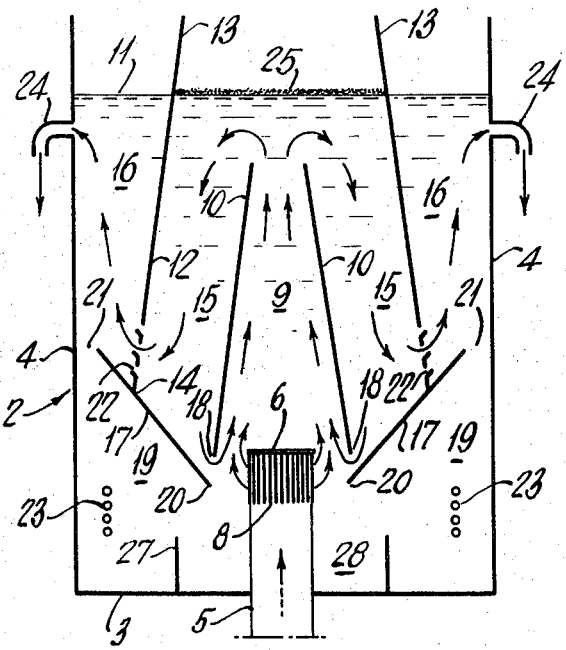
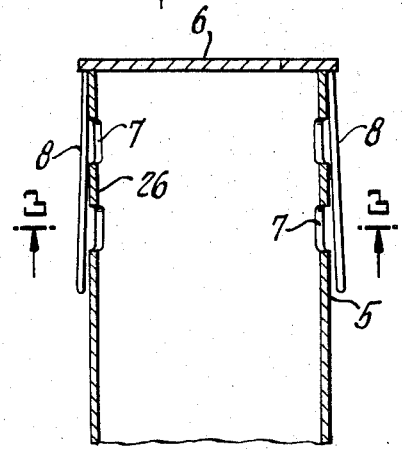
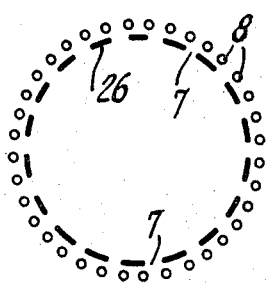

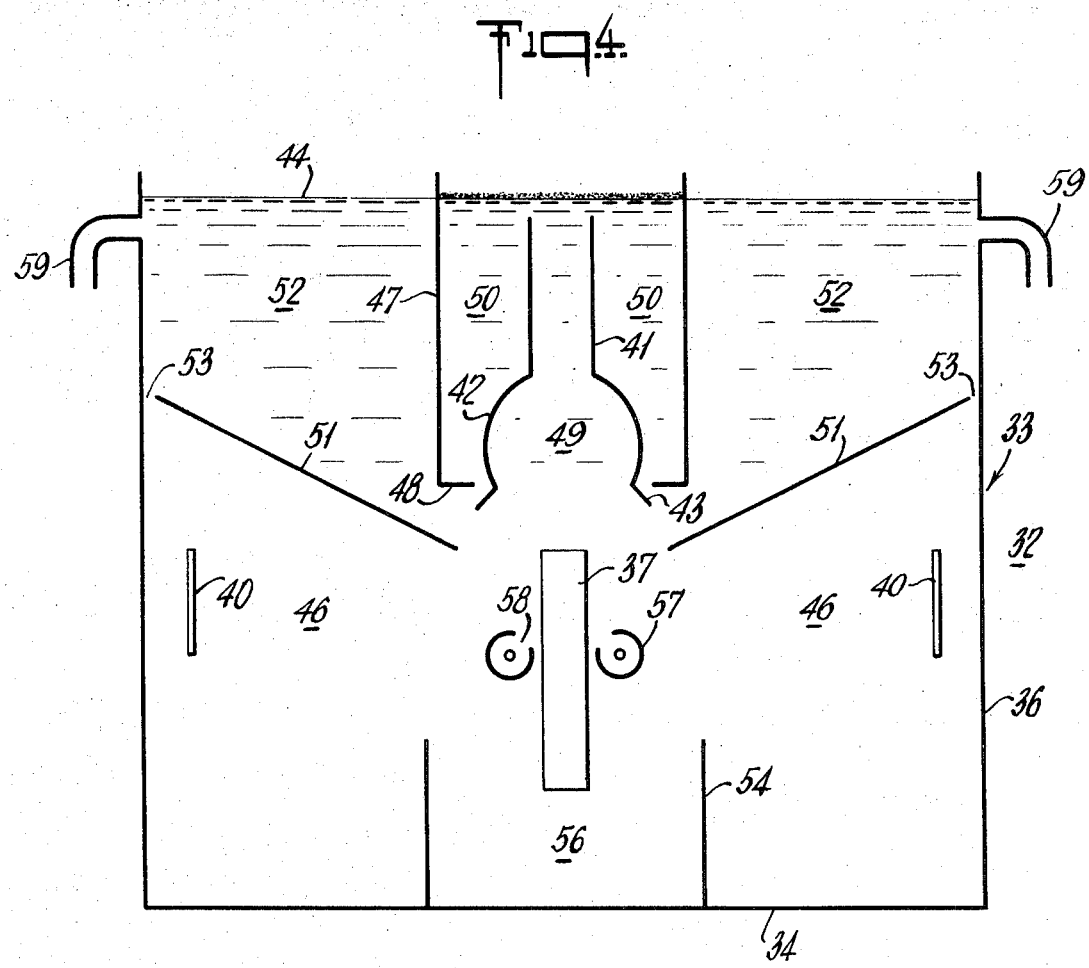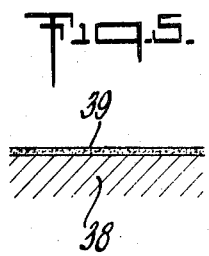

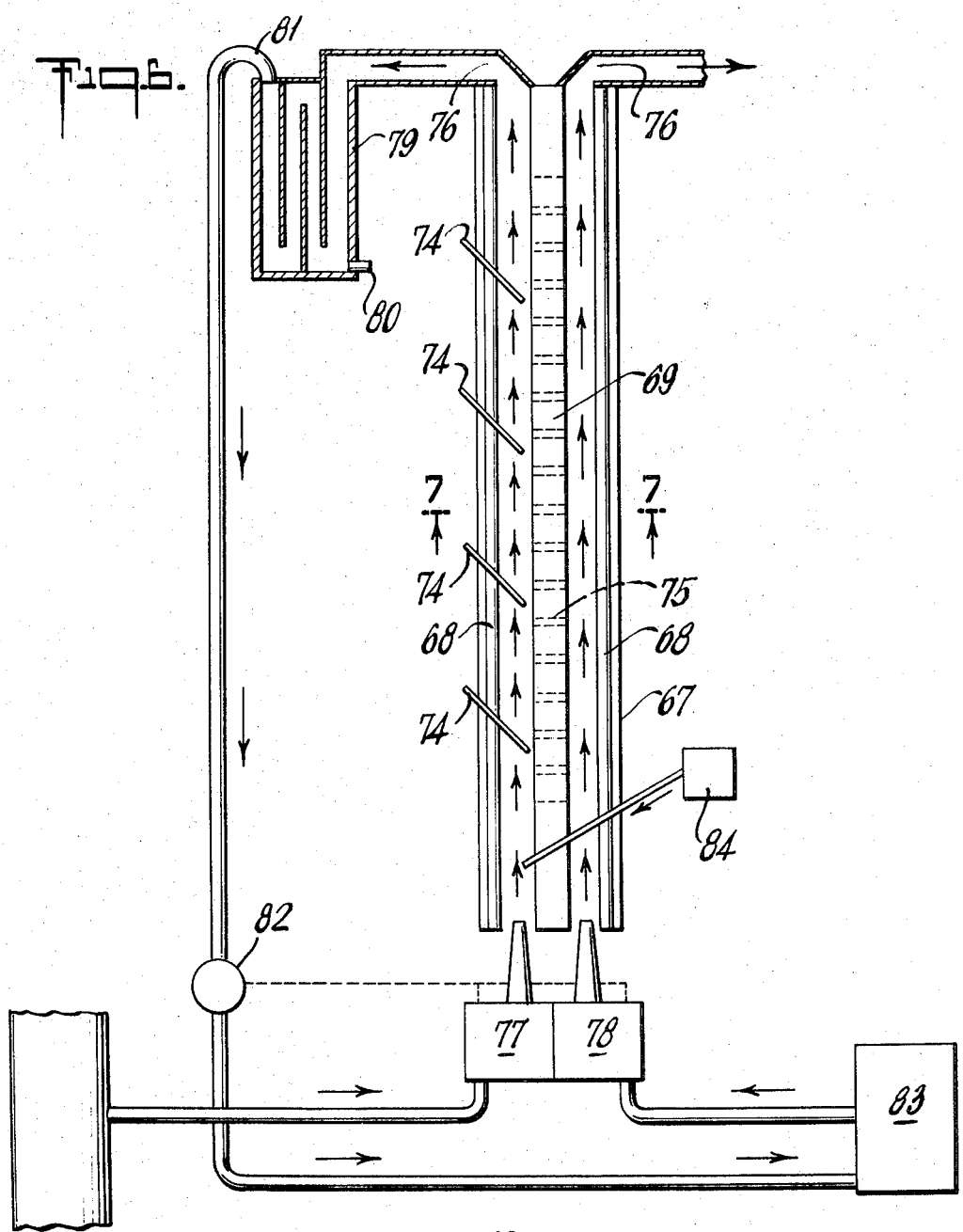

3,756,933
METHOD OF PURIFYING SEWAGE EFFLUENT
AND APPARATUS THEREFOR
Bernard Greenberg, 33—24 Junction Blvd.,
Jackson Heights, N.Y. 11372
Continuation-in-part of application Ser. No. 111,868, Feb.
2, 1971, which is a continuation-in-part of application
Ser. No. 55,121, July 27, 1970, both now abandoned.
This application Aug. 25, 1971, Ser. No. 174,625
Int. Cl. C02b 1/82; C02c 5/12; B01k 3/04
U.S. Cl. 204—149                                   55 Claims

ABSTRACT OF THE DISCLOSURE

Polluted aqueous liquid such as sewage or industrial wastes which contain organic materials which are anionic polyelectrolytes and their precursors, including compounds of phosphorus, nitrogen, carbon or other elements, and a dissolved polyvalent metal such as aluminum, calcium or magnesium and chloride ions is electrolytically treated by circulating the liquid past the cathode and upwardly with the cathode evolved hydrogen to raise the pH of the circulating liquid and precipitate, flocculate and float the alkaline earth products of the products of the organic materials and the other pollutants. The floated materials are separated from the liquid, and the liquid so depleted then flows downwardly, and any unfloated material is returned to the cathode upward liquid flow, and at least part of the liquid is withdrawn from the lower part of the downward flow and is exposed to the oxygen and chlorine bubbles evolved at the anode which is immersed in a quiescent body of the liquid communicating electrically with the cathode. Alternatively the cathode and anode are positioned in respective longitudinal channels separated by macroscopically perforate partition which permits ionic crossflow but inhibits liquid cross flow. The influent traverses the cathode channel and the flocculant skimmed from its surface and then traverses a settling tank and the anode channel to be treated as above. The cathode is formed of a corrosion resistant metal having a thin coating of the electrically non-conducting oxide of the cathode metal and is advantageously titanium. The cell includes a baffle structure which delineates an upward flow first passage above the cathode joined at its top to an adjacent downward flow passage which communicates at its bottom with the first passage and with an upward flowing outer discharge chamber into which gases rise through small openings from an underlying chamber containing the anode in a quiescent body of the liquid.

REFERENCE TO RELATED PATENT APPLICATION

The present application is a continuation-in-part of patent application Ser. No. 111,868 filed Feb. 2, 1971 new abandoned which is a continuation-in-part of patent application Serial No. 55,121 filed July 27, 1970 now abandoned.

BACKGROUND OF THE INVENTION

The present invention relates generally to improvements in the purification of liquids and apparatus therefor. It relates particularly to an improved method and apparatus for the removal from domestic sewage and industrial effluents of such pollutants as nutrients (i.e., compounds of phosphorus, nitrogen and carbon), metals, metal compounds, oil suspensions, bacteria and viruses, and for the elimination of their biological and chemical oxygen demands. It also provides a means for isolating the substances removed and making them available for other purposes, such as for fertilizer, for reclamation of the metals and surface active agents contained therein, or for use as a flocculant.

Most existing methods for treating domestic sewage operate by adding oxygen to the sewage water. They provide only temporary purification, however, because they fail to remove all the nutrients. Consequently, no matter what the oxygen content of the effluent upon leaving the treatment apparatus, later on the nutrients accelerate eutrophication with an excess growth of algae, resulting in a depletion of oxygen and an increase in bacteria and viruses. In addition, the decaying algae impart an undesirable or obnoxious taste and odor to the water.

Microbiological methods do remove some of the nutrients as well as add oxygen, but those methods are complex, expensive, sensitive to temperature variations, and require well trained personnel for their maintenance and operation. The present method and apparatus overcomes most of the drawbacks of these methods; it requires neither elaborate mechanical equipment nor constant supervision and maintenance; it removes the nutrients so that the discharged water does not encourage algae growth; its treated water has a high oxygen content and is lightly chlorinated.

The present method and apparatus for electrolytic treatment of sewage (1) employs a single input feed supplying both anode and cathode chambers, (2) improves the separation and isolation of the cathode chamber from the anode chamber without the use of a diaphragm, (3) exposes the treated water directly to the oxygen and chlorine which are generated at the anode, and (4) is easily adaptable to the treatment of a wide variety of industrial wastes, all with a substantial increase in efficiency, improvement in results, and decrease in cost of operation. In addition, the present invention incorporates many improvements and refinements in the control, operation, and chemical balancing of electrolytic water treatment systems.

SUMMARY OF THE INVENTION

The object of the present invention is to provide an improved method and apparatus for:

(A) treating water, including domestic sewage and industrial waste water;
(B) purifying polluted liquids;
(C) removing aquatic life nutrients from domestic sewage and industrial waste water;
(D) separating and removing suspended hydrocarbon materials including oil from domestic sewage and industrial waste water;
(E) separating and removing other impurities from domestic sewage and industrial waste water;
(F) removing from domestic sewage and industrial waste water metals, metal compounds, surface active agents and compounds of phosphorus, nitrogen and carbon for reclamation and further use;
(G) restoring oxygen to domestic sewage and industrial waste water;
(H) creating anionic polyelectrolytes.

A further object of the present invention is to perform these functions with a method and apparatus which is reliable, efficient, inexpensive, versatile, adaptable, and does not require the use of costly or complicated equipment.

In general terms, the present invention contemplates the treatment of a liquid containing polyvalent metal cations (e.g. aluminum, calcium, magnesium) and organic materials, including compounds of nitrogen, phosphorus, carbon and some other elements, which are, or are capable of becoming, that is, precursors of, anionic polyelectrolytes (hereinafter, for convenience, these compounds are referred to as "the organic material"), by flowing the liquid through three chambers of a four-chambered electrolytic cell, first past the cathode, from where it proceeds upward by convection and flow pressures and by the lifting action of hydrogen bubbles, through the cathode chamber, then downward through a recirculating chamber, then upward again through a polishing chamber where gases generated in the anode chamber are mixed with the liquid. The cathode is advantageously formed of a corrosion-resistant metal having a thin coating of the electrically nonconducting oxide of the cathode metal.

At the cathode and in the cathode chamber, the pH is increased, polyvalent metal products, i.e., compounds or complexes of the organic materials, are caused to precipitate, flocculation occurs, and the resulting floc containing the precipitated compounds and the other impurities of the liquid rises because of the lifting action of the gas sweep, the small amount of resistance heating of the liquid (less than 1° F.), and the lowering of the liquid density as it is freed from its dissolved matter.

Most of the impurities remain at the surface on the first rise. The liquid, relieved of most of its impurities, then continues downward through the recirculating chamber; those particles which did not remain at the surface on the first rise are redirected into the cathode chamber for further treatment, while the now nearly-pure liquid flows into the polishing chamber where it is exposed to the oxygen and chlorine which have been generated immediately below in the anode chamber.

An alternate procedure which may be employed to great advantage relies on the use of an improved horizontal electrolytic cell in the form of a pair of horizontal or slightly inclined side by side channels separated by a medial longitudinal perforated wall or a pair of transversely spaced parallel perforated walls which delineate a quiescent liquid zone, so as to permit the free passage of ions between the channels while inhibiting the cross flow of liquid. A cathode and an anode extend along respective channel outerfaces and are connected to respective poles of a DC power supply. The liquid influent, of the composition described above, is metered to flow along the first channel, then through a baffled settling tank, through a pH control unit and thence metered through the anode channel from the end of which it is discharged. As the liquid flows along the cathode channel the pH is increased and flocculation and floatation occurs, as explained above, and the floated flocculated material is suitably skimmed from the liquid surface in the cathode channel.

With this improved treatment there is a substantial reduction in the liquid's impurities, including its phosphorus content, nitrogen content and chemical and biological oxygen demands, as well as a high increase in its dissolved oxygen. In addition, the bacteria and virus population are substantially destroyed.

A BRIEF DESCRIPTION OF THE DRAWING

FIG. 1 is a vertical, sectional view of an improved apparatus which may be employed for practicing the present improved method, the liquid flow therethrough being shown by arrows;

FIG. 2 is a detail view of the cathode end of the input pipe shown in FIG. 1;

FIG. 3 is a sectional view taken along line 3—3 in FIG. 2;

FIG. 4 is a view similar to FIG. 1 of another embodiment of the present invention;

FIG. 5 is an enlarged fragmentary sectional view of the cathode;

FIG. 6 is a top plan schematic view of a further embodiment of the present invention; and FIG. 7 is a sectional view taken along line 7—7 in FIG. 6.

DESCRIPTION OF THE PREFERRED EMBODIMENTS

Referring to the drawing, and particularly FIGS. 1 to 3 thereof, which illustrates one preferred embodiment of the present invention in circular form, reference numeral 1 generally designates the improved electrolytic cell apparatus, the cell comprising an open-topped cylindrical tank 2 including bottom 3 and peripheral wall 4. Projecting through bottom 3 and coaxial with tank 2 is an inlet pipe 5 which has a closed top 6 positioned above bottom 3 and has outlet ports 7 formed in the peripheral wall and near the top of the inlet pipe 5. A perforate cylinder 8, which may be formed of spaced wires, foil or rods, surrounds outlet ports 7 and the upper part of inlet pipe 5, and is attached to inlet pipe 5 at the top. Together, perforate cylinder 8 and the upper portion of inlet pipe 5 constitute an electrically connected bi-metallic cathode whose cover is perforate cylinder 8 and whose core 26 is the upper part of inlet pipe 5. The bi-metallic cathode is herein designated by the numeral 8–26 and is connected to the negative terminal of a DC voltage source.

Cathode core 26 is formed of a metal which is high on the electromotive force series, such as aluminum or magnesium. Cathode cover 8 is formed of a metal which forms a tough, thin, anodized, electrically nonconducting oxide film on its surface, and which is dissimilar to and lower on the electromotive force series than the metal of cathode core 26. Examples are titanium, lead, platinum and tungsten. Cathode cover 8 is attached to cathode core 26 at the top.

A cathode chamber 9 is delineated by a chimney or first baffle 10 which is of a frustoconical shape, coaxial with tank 2, open at its top and bottom, and converging upwardly. Then open bottom of first baffle 10 is located outwardly from and approximately level with the top of cathode 8–26. The open top of first baffle 10 is located below fluid level 11. A second baffle 12, which also is of a frustoconical shape, open at its top and bottom, coaxial with tank 2, and converging upwardly, separates a recirculating chamber 15 from a polishing chamber 16. The upper edge 13 of a second baffle 12 is above fluid level 11 and is level with or above the top of tank 2; its lower edge 14 attaches to third baffle 17 at a point above and outward from the bottom edge 18 of first baffle 10.

A third baffle 17, which is also of a frustoconical shape, coaxial with tank 2, an open at its top and bottom, but which converges downwardly, separates anode chamber 19 from both recirculating chamber 15 and polishing chamber 16; its lower edge 20 is spaced outward of and level with the upper portion of cathode 8–26 and its upper edge 21 is slightly inward from tank wall 4. Second baffle 12 is perforated near its bottom 14 with narrow ports 22 angled upward and outward. A fourth baffle 27 of cylindrical shape projects upward from tank bottom 3 to a point approximately level with the bottom of anode 23 and defines an open topped chamber 28. All four baffles 10, 12, 17 and 27 are formed of an inert, imperforate, nonconducting material, for example, polyvinyl chloride, polyester or the like.

An anode-defining cylindrical electrode 23, coaxial with and spaced outwardly of and beyond the bottom edge 20 of third baffle 17, and at about the level of cathode 8–26 is positioned in anode chamber 19 and may be formed of interconnected circular conducting wires. Anode 23 is connected to the positive terminal of the DC voltage source. The materials for cathode cover 8, cathode core 26 and anode 23 are resistant to their respective ambient conditions. Outlet pipes 24 communicate with polishing chamber 16 through the upper border of tank wall 4.

Liquid to be treated flows upwardly through inlet pipe 5, outwardly through ports 7 in cathode core 26 and through cathode cover 8, thence upwardly through cathode chamber 9, over the top of first baffle 10, where it reverses direction and flows outwardly and downwardly through recirculating chamber 15, near whose bottom it again reverses direction and flows outwardly and upwardly, through ports 22 in second baffle 12, and into polishing chamber 16, through which it flows upwardly to outlet pipe 24.

In FIGS. 4 and 5 of the drawings there is illustrated another form of electrolytic cell, rectangular in shape, which embodies the present invention and which also may be employed in practicing the process of the present invention. It differs from the circular apparatus, earlier described, primarily in its shape and in the baffle and electrode structure. The rectangular cell 32 includes an open topped rectangular tank 33 provided with a base wall 34 and side walls 36. Medially located in tank 33 a short distance above base wall 34 is a vetically extending high surface area cathode 37. Cathode 37 comprises a substrate 38 formed of a metal which is corrosion resistant under the ambient conditions and which, like cathode cover 26, earlier described, is capable of forming a tough, thin, anodized, electrically nonconducting oxide layer or film, and a thin layer 39 of such electrically nonconducting oxide which coats substrate 38. Titanium is employed to great advantage for cathode substrate 38 with coating 39 being the oxide of titanium. Examples of other metals which may be employed are magnesium, aluminum, tungsten, platinum and lead.

Anodes 40 are located proximate tank wall 36, on opposite sides of cathode 37, and at approximately the level of the upper portion of cathode 37.

Positioned above cathode 37 and in vertical alignment therewith are baffles delineating a vertical chimney 41 which includes an outwardly bulging enlarged cylindrical bottom section 42 terminating in a bottom downwardly outwardly directed flange 43 disposed a short distance above cathode 37. A second baffle 47 surrounds chimney 41 and extends vertically downwardly from shortly above liquid level 41 and terminates at its bottom in a peripheral inwardly directed lip 48 at the level of the top of flange 43 and delineates a peripheral opening therewith. The chimney 41 defines cathode chamber 49 having a bottom inlet facing cathode 37 and communicating at its top with recirculating chamber 50 delineated by chimney 41 and baffle 47.

An inclined third baffle 51 extends from wall 36 downwardly and inwardly to a point below flange 43 and delineates an opening therewith. A plurality of small gas bubble outlet openings 53 are disposed along the upper edge of inclined baffle 51 and may be defined by a continuous slit between wall 36 and the upper edge of inclined baffle 51. A fourth vertical baffle 54 projects upwardly from base 34 to a point approximately level with the bottom of anode 40 and defines an open topped chamber 56.

Inlet pipes 57, which are connected to the influent to be treated, are positioned proximate each face of cathode 37, below the top thereof, and are provided with outlet ports 58 which are directed upwardly toward the faces of cathode 37 and which are advantageously concentric with radial axes of pipe 57 about 20° to the horizonal. Discharge pipes or overflow weirs 59 are located at and communicate with the upper part of tank 33. The chimney and baffles are formed of inert imperforate electrically insulating material.

The operation of cell 32, last described, is similar to that of cell 1, first described. Microbubbles of hydrogen are evolved at cathode 37, and oxygen and chlorine bubbles at anode 40. The influent entering through ports 58 traverses a path upwardly along and in the zone surrounding cathode 37 where an upward convection flow is provided by the gas sweep, the slight heating and the lowered density, thence upwardly through cathode chamber 49, over the top of chimney baffle 41, downwardly through recirculating chamber 50, into polishing chamber 52 and then discharged. In its upward flow from cathode 37 the liquid pH is raised and the pollutants are precipitated, flocculated and floated, as described above, the floatation being encouraged by microbubbles formed at cathode 37 and by the outward flow of liquid over the top of chimney baffle 42. The liquid from which the floated material has been separated flows downwardly through recirculating chamber 50 through the opening between flanges 43 and 48, and thence into polishing chamber 52 where it is admixed with the anode evolved bubbles, oxygen and chlorine as earlier described, rising through openings 53, and then discharged. Any precipitate which is not floated on the first rise recirculates toward cathode 37 and into cathode chamber 49 through the opening between flange 43 and baffle 51, and is lifted again to the surface along with the rising liquid in cathode chamber 49. The body of liquid in anode chamber 46 is in a substantially quiescent state communicating electrically with cathode 37 between the proximate edges of baffles 51 and 54, and releasing its oxygen and chlorine bubbles into chamber 52 through openings 53. Moreover, baffle 54 is dimensioned and positioned to contain any leakage of influent off cathode 37, prevent its entry into anode chamber 46, and help it to be gently picked up by the cathode induced convection.

The slime floating on liquid surface 44 is contained within the upper borders of baffle 47 and may be removed in any suitable manner and reused or recovered in the manner elsewhere described for other uses and applications.

While there have been described and illustrated preferred embodiments of the present invention it is apparent that numerous alterations, omissions and additions may be made without departing from the spirit thereof. Moreover, while the apparatus has been illustrated in two configurations, circular and rectangular, it may be fashioned in other designs and combinations with the shapes of the baffles and other components correspondingly modified.

The flow-rate through the electrolytic cells is advantageously of a non-turbulent nature, and is laminar over the cathode surface. It is aided by the rising in the cathode and polishing chambers of gas bubbles evolved at the cathode and anode, respectively.

Prior to treatment, the liquid to be treated should be passed through a grit chamber or screen to remove particles which would be too large to pass through cathode cover 8. In the liquid to be treated, the molar concentration of the dissolved polyvalent metals or cations is advantageously at least equal to that of the organic materials. The presence of a chloride in the liquid input produces chloride at the anode which reduces or eliminates the bacteria and virus content of the liquid.

Domestic sewage naturally contains the organic materials which are essential to the present process and it frequently contains as well the necessary concentration of polyvalent cations in the form of alkaline earth-metals and it is advantageous to add cations of higher valency such as aluminum. Many industrial wastes are inorganic in origin, however, and, therefore, require the addition to the liquid input of the necessary organic materials. In or near urban areas these can best be obtained merely by drawing from or mixing with a sufficient supply of domestic sewage. In this fashion domestic sewage may well be the best agent for "cleaning" many types of industrial waste water. Alternatively, the organic materials can be obtained by mixing with the liquid input the slime 25 which the present invention produces.

Should a particular liquid to be treated be deficient to polyvalent metals, however, the proper concentration may easily be achieved by metering into and mixing with the liquid input a solution of a polyvalent metal such as an aluminum, calcium or magnesium salt, for example sea water, at a rate sufficient to achieve the proper molar concentration of polyvalent metals. For even the strongest liquid input of domestic sewage, no more than 0.060 gram of magnesium ion or 0.100 gram of calcium ion per liter are required. Advantageously, the ratio by weight of the calcium ion to the weight of the pollutant materials exceeds 1:50 and is preferably of a ratio of about 1.10, the calcium being replaceable in whole or part by a molar equivalent thereof of magnesium, aluminum or other polyvalent metal.

The liquid input also advantageously contains chloride ions which, if not found naturally in the liquid input, may be added thereto as a salt solution or as sea water. The molar concentration of the chloride ion is advantageously at between 0.25 and —.75 grams per liter. If sea water is used to supply the alkaline earth-metals or the chlorides, its volume need be no more than 5% of the liquid to be treated. Use of alkaline earth-metals other than calcium or magnesium is undesirable because of their toxicity and high cost.

The anode is formed of a material resistant to nascent oxygen and chlorine and other ambient conditions to which it is exposed, and is connected to the positive terminal of the DC power supply. The anode is advantageously highly polished to promote the adherence of the evolved gas bubbles and the accumulation thereof into larger bubbles. It is located at a position in both tanks substantially out of the flow path of liquid and in a chamber of the cell where the liquid is in a substantially quiescent state.

The voltage between cathode and anode is adjusted so that the pH around the cathode and in the cathode chamber is at least 9.0 and preferably between 9.0 and 10.0, such voltage advantageously being of a value to maintain a current flow of 0.1 to 0.2 ampere hours per gallon of effluent fee, preferably a voltage between 5 and 15 volts. The liquid input is likewise adjusted to achieve the 0.1 to 0.2 ampere hour per gallon of effluent while maintaining the liquid flow over the cathode surface and through the cathode, recirculating and polishing chambers in a connective, non-turbulent nature.

For efficient operation, the oxide film on the cathode surface should be maintained; it may be restored hourly by a ten-second reversal of the polarity of the two electrodes, that is by connecting the cathode and anode to the positive and negative terminals, respectively, of the power supply.

At the cathode hydrogen gas is evolved and the hydroxyl ion concentration is increased to raise the pH around the cathode and in the cathode chamber to 9.0 or above. Simultaneously, with the oxide film on the cathode surface acting as a catalyst, organic molecules are temporarily chemisorbed to the surface of the cathode surface where they receive electrons from the DC current and are transformed into insoluble compounds formed by the combining of the alkaline earth-metals with the organic materials. Polyelectrolytes are created, and flocculation occurs. The resulting material is lifted by the rising hydrogen bubbles to the liquid surface where it floats within the area circumscribed by the second baffle as a slime which can be removed by skimming, by suction, or by other suitable means.

The separated slime is valuable by-product of the process. It contains nearly all of the nitrogen, phosphorus, sulphur and carbon and the majority of the heavy metals and other pollutants originally found in the liquid input. It has exhausted only a portion of its potential as a flocculant, and may be reused in this or another process as a flocculating agent. Being rich in phosphorus and nitrogen, it may be air-dried and used as a fertilizer. Where desired, it may be subjected to treatment for the reclamation of particular metals and surface active agents which may have been contained in the effluent feed.

In both the circular and rectangular cells, after the precipitation, flocculation and flotation near the cathode and in the cathode chamber, the effluent, now depleted of almost all its pollutants flows downwardly through the recirculating chamber. If there are any suspended particles which may not have remained at the liquid surface after their initial rise through the cathode chamber, when they reach the bottom of the recirculating chamber they continue to fall and are deflected by the third baffle downwardly and inwardly toward the cathode, where they are again subjected to the lifting action of the hydrogen bubbles and recirculating upward through the cathode chamber to the liquid surface. When the clean liquid nears the bottom of the recirculating chamber, it again reverses its flow and moves upwardly and outwardly at the bottom of the second baffle into the polishing chamber.

The anode generates oxygen and chlorine which rise through the anode chamber and through the passage between the tank wall and the upper edge of the third baffle into the polishing chamber where they mix with, cleanse and polish the liquid. Physical separation and isolation of the anode chamber from the remainder of the process is aided in both forms of apparatus by the third and fourth baffles, and by maintaining a non-turbulent flow of liquid input through or along the cathode at a rate which causes the liquid to be swept by the rising hydrogen bubbles upward into the cathode chamber, rather than outward into the anode chamber.

Chloride ions transfer to the anode not by a liquid flow, but by a diffusional process. Very little liquid flows through the anode chamber, the liquid therein being in a substantially quiescent state. The oxygen and chlorine evolved a the anode are deflected by the third baffle outward and upward into the polishing chamber where they assist the upward flow of the liquid to the outlet pipe. While in the polishing chamber the liquid absorbs both oxygen and chlorine, thereby further reducing its chemical and biological oxygen demands. In addition, the chlorine gas oxidizes trace pollutants which have not been separated in the cathode chamber and destroys bacteria and viruses which may be present. Sufficient chlorine remains in the discharge liquid to yield oxygen by photolytic reaction, the oxygen remaining in the water and thereby increasing its fitness for discharge into natural bodies of water.

By way of example, domestic sewage was treated in cell 1 by the method described above, the feed having concentrations in parts per million as follows: phosphate—15.0; combined nitrogen 20.0; chloride—105.0; chemical oxygen demand—350.0; dissolved oxygen—2.0; biological oxygen demand—120.0. After treatment, the liquid discharge had concentrations in parts per million as follows: phosphate—0.0; combined nitrogen—0.1; chloride—100.0; chemical oxygen demand—30.0; dissolved oxygen—10.0. Results of the present method and apparatus are highly consistent in the treatment of liquids no matter what their source, as long as the liquid input contains proper amounts of the organic materials and alkaline earth-metals.

Another improved form of apparatus which may be employed to practice the present process is illustrated in FIGS. 6 and 7 of the drawings, the apparatus being generally designated by the reference numeral 65 and comprises a horizontally extending electrolytic cell 66. Electrolytic cell 66 includes a longitudinal base plate 67 formed of an insulating material, or a metal such as aluminum or steel coated with an insulator resin coating such as Teflon. A pair of transversely spaced longitudinally extending side walls 68 of an insulating material, such as organic polymeric resin, project upwardly from the side borders of face plate 67 and affixed in grooves formed therein. Also projecting upwardly from base plate 67 intermediate side walls 68 is a longitudinally extending thick vertical partition 69 which extends above the level of walls 68 and defines therewith and base plate 67 parallel cathode and anode chambers 70 and 71, respectively.

The partition 69 is formed of an insulating material such as any suitable synthetic organic polymer and is provided below the level of the tops of walls 68 and between points spaced inwardly from the ends of partition 69 with closely spaced transverse bores 75 having inwardly tapered outer ends and being dimensioned to permit the free and unimpeded passage of ions of large size therethrough while substantially inhibiting any cross flow of liquid between channels 70 and 71, particularly in the absence of a significant difference in head between the liquid in the channels. The faces of the bores 75 are treated to increase their coefficient of friction whereas the faces of walls 68, partition 69 and base plate 67 which delineate the channels possess a very low coefficient of friction coefficient. Advantageously the thickness of partition 69 is between ⅛ inch and 4 inches and the bores 75 have diameters between ½₀₀ inch and 1 inch. While the partition perforations have been illustrated as circular bores they may assume any desired shape such as slits or the like provided that they function in the above manner and preferably have their minimum dimension between ½₀₀ and 1 inch and they may be angled opposite to the angle of liquid flow to further prevent the cross flow of liquid.

A metal cathode 72 is positioned in and extends along the length of cathode chamber 70 in engagement with a corresponding wall 68 and a metal anode 73 is positioned in and extends along the length of anode chamber 71 along the length of a respective wall 68. A plurality of regularly spaced recesses are formed in the upper borders of cathode 72 and adjacent wall 68 and rectangular skimming plates 74 of insulating material extend across the recesses along their rear edges and are forwardly outwardly inclined and have bottom edges at about the level of the liquid flowing through cathode channel 70. Thus, any slime or flocculated material floating on the liquid surface is skimmed by plates 74 and discharged through the wall and cathode upper border openings. The cathode 72 and anode 73 are formed of materials similar to those of the cathodes and anodes earlier described. The trailing or feed ends of channels 70 and 71 are closed whereas the discharge ends 76 thereof are restricted and shaped to maintain a suitable liquid level in channels 70 and 71.

A pair of adjustable liquid metering devices 77 and 78 discharge into the feed ends of cathode channel 70 and anode channel 71 respectively, and are adjusted to have substantially the same feed or delivery rates, the inlet to device 77 being connected to the liquid influent which is to be treated. The cathode channel outlet 76 is connected to the inlet of a settling tank 79 which is baffled to impart a sinuous path to the liquid flowing therethrough. Settling tank 79 is provided with a bottom sediment drain 80 and a top outlet 81 which is connected to the inlet of a pump 82 whose outlet is connected through a pH control device and analyzer and detector unit 83 of any suitable construction to the inlet of metering device 78. A metering device 84 having an outlet connected to the trailing end of cathode channel 70 feeds an alum solution or a solution of any other polyvalent metal in accordance with the present process into the influent liquid traversing the cathode channel 70.

In the operation of the apparatus 65 in accordance with the present method a voltage is applied between the cathode and anode of the order described earlier. The influent, or untreated waste water is metered into the inlet to cathode channel 70 as is a solution of a polyvalent metal, advantageously an alum solution, at a rate related to the influent flow as explained above. The pH of the liquid traversing the cathode channel increases and the reaction products of the liquid pollutants and the polyvalent metal as well as the materials carried thereby are flocculated and floated and the floated materials skimmed from the liquid surface by skimming plates 74 and discharged and suitably removed. The cathode treated liquid then flows through tank 79 to settle any materials still entrained in the liquid and the supernatant liquid is then flowed through the anode channel 71 and treated therein as earlier described and then discharged in a purified state.

The use of alum has been found to be more effective as a flocculant in the present process than calcium or magnesium by reason of its higher valency, metals of increased valency being of correspondingly greater effectiveness. The use of the apparatus 65 possesses many advantages. It allows a higher ratio of electrode surface to cell volume thereby exposing the flowing liquid to the electrode surfaces for a much longer time for a given amount of electricity and the cell is of very simple, rugged and inexpensive construction and simple to observe, adjust and service. It should be noted that while the electrode channels are shown as being open-topped they may be fully enclosed and shaped otherwise than as shown. Furthermore, each channel may be inclined along its length either upwardly or downwardly in the direction of flow to achieve superior flow characteristics and contour, or one channel may be inclined more than the other so as to produce a greater flow rate on one side or the other while volume of water passing is constant. In addition, a pair of transversely spaced partitions 69 may be provided between the electrode channels, the zone between the channels being occupied by a quiescent pool of liquid to further inhibit liquid crossflow. It should be noted that the partition 69 is basically different from a semipermeable membrane in among other properties in that the openings therethrough are macroscopic in dimensions and thus of a different order of magnitude than the microscopic pores in a semipermeable membrane.

What is claimed is:

1. The method of treating and purifying a polluted aqueous liquid containing dissolved polyvalent metals and organic materials which are anionic polyelectrolytes, or precursors thereof, including compounds of nitrogen, phosphorus, carbon and some other elements, comprising the steps of flowing said liquid through an electrolytic cell having spaced cathode and anode electrodes connected to the negative and positive terminals of a direct current source, first in the zone of said cathode to raise the pH of said liquid and expose it to the bubbles dissolved at and rising from said cathode, whereby to precipitate, flocculate and float metal products of said organic materials, separating said floated products from said liquid, and thereafter exposing said liquid to the gas bubbles evolved at said anode.

2. The method of claim 1, wherein the liquid flows through the electrolytic cell in substantially a non-turbulent state.

3. The method of claim 1, wherein the liquid influent is passed over the cathode surface in a laminar flow.

4. The method of claim 1, wherein said cathode is formed of a metal having a thin, anodized, electrically nonconducting oxide coating of said metal.

5. The method of claim 1, including the step of periodically reversing the polarities of said anode and cathode to rehabilitate said oxide coating on the cathode.

6. The method of claim 1, wherein said liquid is circulated along a predetermined flow path, first upward, then downward, and then upward again.

7. The method of claim 1, wherein the liquid flows upwardly in the cathode zone, the cathode being disposed in the lower portion of said cathode zone.

8. The method of claim 1, including the step of recirculating a part of said liquid and material contained therein, from which part of the pollutant materials have been separated, into the path of said bubbles rising from said cathode.

9. The method of claim 1, wherein liquid is withdrawn from a lower part of said downward flow path and exposed to said anode-evolved bubbles in the second upward path prior to its discharge.

10. The method of claim 1, wherein the anode is positioned below the second upward flow path so that the oxygen and chlorine generated at the anode may rise into and directly mix with, cleanse and polish the liquid being treated prior to its discharge.

11. The method of claim 1, including the step of positioning said anode in a part of said electrolytic cell where said liquid remains in a substantially quiescent state, said liquid communicating electrically with said cathode.

12. The method of claim 1, wherein the liquid flowing through the electrolytic cell has chloride ions therein, and said withdrawn liquid is exposed directly to chlorine electrolytically freed at the anode.

13. The method of claim 1, wherein said withdrawn liquid is exposed directly to oxygen electrolytically freed at the anode.

14. The method of claim 1, wherein the polyvalent metals are at a molar concentration at least equal to that of the organic materials.

15. The method of claim 1, wherein the polyvalent metal is an alkaline earth-metal.

16. The method of claim 1, wherein the polyvalent metal is aluminum, calcium or magnesium.

17. The method of claim 1, wherein the pH of the liquid is raised to at least 9.0 in the cathode zone.

18. The method of claim 1, wherein the pH of the liquid in the zone where it is exposed to said anode-evolved bubbles is approximately 7.0.

19. The method of claim 1, wherein the current between the cathode and anode is between 0.1 and 0.2 ampere hours per gallon of liquid flowing through the cell.

20. The method of claim 1, wherein the voltage between the anode and cathode is between 5.0 and 15.0 volts.

21. The method of claim 1, including the flotation in the cathode chamber of the precipitated and flocculated material by micro-bubbles of hydrogen electrolytically produced at the cathode.

22. The method of claim 1, including the removal of the floating precipitated and flocculated material from the liquid.

23. The method of claim 1 including the step of introducing organic anionic polyelectrolytes into the aqueous liquid.

24. The method of claim 1, including the step of introducing into the aqueous liquid preprecipitated and flocculated alkaline earth-metal products of organic materials.

25. The method of preparing a polluted liquid for treatment with the method of claim 1, by adding domestic sewage thereto to provide organic materials.

26. The method of preparing a polluted liquid for treatment with the method of claim 1, by adding sea water thereto to provide alkaline earth-metal ions.

27. The method of preparing a polluted liquid for treatment with the method of claim 1, by adding sea water thereto to provide chloride ions.

28. The method of preparing a polluted liquid for treatment by the method of claim 1, by adding salts of the polyvalent metals thereto to provide polyvalent metal ions.

29. The method of preparing a polluted liquid for treatment by the method of claim 1, by adding thereto magnesium chloride or calcium chloride to provide chloride ions.

30. A liquid treating electrolytic cell comprising a tank, a cathode positioned in said tank, means including an inlet pipe for directing an influent over the surface of said cathode and into a zone proximate thereto, a baffle structure for directing the flow of the liquid through the cell consisting of a chimney or first baffle delineating an upward flow first passageway between said cathode and the upper part of said tank and in vertical alignment with said cathode, a second, outer baffle delineating a downward flow second passageway, said passageways being open at their tops and bottoms and being in mutual communication, and a third baffle extending upwardly and outwardly from a position between said second passageway and said cathode and provided with small openings proximate the upper portion thereof, and an anode positioned in said tank below said third baffle and in electrical communication with said cathode.

31. The electrolytic cell of claim 30, wherein said cathode is formed of a metal selected from the class consisting of titanium, tungsten, magnesium, aluminum and lead and alloys thereof.

32. The electrolytic cell of claim 30, wherein the material of the cathode surface is fashioned so as to promote the formation and release of hydrogen in micro-bubble form, and to inhibit their accumulation into larger bubbles.

33. The electrolytic cell of claim 30, wherein said anode is formed of a metal selected from the class consisting of platinum, lead dioxide and titanium.

34. The electrolytic cell of claim 30, wherein the material of the anode is highly polished and promotes the adherence of the evolved micro-bubbles of oxygen and chlorine and the accumulation thereof into larger bubbles.

35. The electrolytic cell of claim 30, wherein the first passageway, second passageway and third passageway are delineated from each other by a baffle structure consisting of inert electrically insulating separators arranged so that the liquid flows from the cathode into the cathode chamber through the recirculating chamber and into the polishing chamber.

36. The electrolytic cell of claim 30, wherein said baffle structure includes a vertical chimney defining said first passageway.

37. The electrolytic cell of claim 30, wherein the bottom section of said chimney is of enlarged transverse cross-section.

38. The electrolytic cell of claim 30, wherein said baffle structure includes a vertically extending outer second baffle projecting above the top of said chimney and transversely spaced therefrom.

39. The electrolytic cell of claim 30, wherein the lower parts of said chimney and outer second baffle delineate a restricted outlet opening from said second passageway.

40. The electrolytic cell of claim 30, wherein said baffle structure includes a third baffle extending from a position below said chimney baffle to a position closely spaced from the wall of said tank.

41. The electrolytic cell of claim 30, wherein said cathode comprises a metal substrate and a thin, electrically nonconducting oxide coating of said metal.

42. The electrolytic cell of claim 30, including means for directing an inlet liquid flow into said tank proximate said cathode and upwardly along a first path.

43. The electrolytic cell of claim 30, wherein said inlet pipe is positioned proximate said cathode and is provided with ports upwardly and inwardly directed toward said cathode.

44. The electrolytic cell of claim 30, including means for inhibiting the flow of liquid through the zone surrounding said anodes, while maintaining electrical connection through the liquid between cathode and anode.

45. The electrolytic cell of claim 30, including an open-topped chamber positioned below said influent inlet ports.

46. The electrolytic cell of claim 30, wherein the cathode is constructed of dissimilar metals, one of them forming a hollow core with outlet ports to permit a non-turbulent flow of liquid input past a second metal which covers the hollow cathode core in the form of wire, foil or rods superimposed over the hollow cathode core, and spaced sufficiently far apart to permit the liquid input to flow in a non-turbulent manner through the ports of the cathode core, through and along the cathode cover and upwards into the cathode chamber.

47. The electrolytic cell of claim 46, wherein the inlet pipe feeds into a hollow cathode having ports through which the liquid may flow to the cathode surface and into the cell's cathode chamber.

48. The electrolytic cell of claim 46, wherein the metal forming the cathode core is aluminum or magnesium.

49. The electrolytic cell of claim 46, wherein the metal of the cathode cover is titanium, lead or tungsten.

50. The electrolytic cell of claim 46, wherein the metal of the cathode cover is lower on the electromotive force series than that of the cathode core.

51. The electrolytic cell of claim 46, wherein the metal forming the cathode cover is attached to the metal of the cathode core at only one end of the cathode.

52. The electrolytic cell of claim 46, wherein the metal forming the cathode cover is one which forms a thin, tough, anodized electrically-nonconducting oxide film on its surface.

53. The method of creating anionic polyelectrolytes by flowing domestic sewage through the electrolytic cell of claim 30.

54. The method of claim 1 wherein said electrolytic cell comprises a pair of transversely spaced longitudinally extending channels separated by a partition having macroscopic openings therein which permit the free passage of ions and substantially inhibit the flow of liquid therethrough said cathode and anode being positioned in said channels transversely spaced from said partition and said liquid first flowing along the cathode containing channel and then along the anode containing channel.

55. The method of claim 54 wherein said openings have a minor dimension between $1/200$ and 1 inch.

References Cited

UNITED STATES PATENTS

| | | | |
|---|---|---|---|
| 1,507,121 | 9/1924 | Landreth | 204—149 |
| 2,158,595 | 5/1939 | Slagle | 204—151 |
| 2,341,356 | 2/1944 | Briggs | 204—151 |
| 2,535,035 | 12/1950 | Briggs | 204—151 |
| 3,347,786 | 10/1967 | Baer et al. | 204—149 X |
| 3,505,188 | 4/1970 | Pan | 204—149 |
| 590,801 | 9/1897 | Brown | 204—237 X |
| 1,225,052 | 5/1917 | Piguet | 204—237 X |
| 2,535,966 | 12/1950 | Teplitz | 204—237 X |
| 3,222,269 | 12/1965 | Stanton | 204—272 X |

JOHN H. MACK, Primary Examiner

A. C. PRESCOTT, Assistant Examiner

U.S. Cl. X.R.

204—151, 237, 272, 275